US012566554B2

(12) United States Patent
Szabó et al.

(10) Patent No.: US 12,566,554 B2
(45) Date of Patent: Mar. 3, 2026

(54) MANAGING DATA STORAGE IN A COMMUNICATIONS SYSTEM

(71) Applicant: Telefonaktiebolaget LM Ericsson (publ), Stockholm (SE)

(72) Inventors: Róbert Szabó, Budapest (HU); Ákos Recse, Halasztelek (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/701,331

(22) PCT Filed: Oct. 15, 2021

(86) PCT No.: PCT/EP2021/078699
§ 371 (c)(1),
(2) Date: Apr. 15, 2024

(87) PCT Pub. No.: WO2023/061613
PCT Pub. Date: Apr. 20, 2023

(65) Prior Publication Data
US 2025/0258612 A1      Aug. 14, 2025

(51) Int. Cl.
*G06F 3/06* (2006.01)
*G06F 11/20* (2006.01)

(52) U.S. Cl.
CPC ............ *G06F 3/0619* (2013.01); *G06F 3/065* (2013.01); *G06F 3/067* (2013.01); *G06F 11/2094* (2013.01)

(58) Field of Classification Search
CPC ........ G06F 3/0619; G06F 3/065; G06F 3/067; G06F 11/2094
See application file for complete search history.

(56) References Cited

U.S. PATENT DOCUMENTS

| | | | |
|---|---|---|---|
| 8,266,237 B2 | 9/2012 | Moore et al. | |
| 8,799,746 B2 | 8/2014 | Baker et al. | |
| 10,296,258 B1 * | 5/2019 | Richardson | G06F 3/0604 |
| 10,484,246 B1 * | 11/2019 | Leach | H04L 47/828 |
| 2017/0185330 A1 | 6/2017 | Danilov et al. | |

(Continued)

FOREIGN PATENT DOCUMENTS

WO        2023284984 A1     1/2023

OTHER PUBLICATIONS

Xie et al., A Decentralized Storage Cluster with High Reliability and Flexibility, 2006, IEEE, pp. 1-8. (Year: 2006).*

(Continued)

*Primary Examiner* — John J Tabone, Jr.
(74) *Attorney, Agent, or Firm* — Withrow & Terranova, PLLC

(57) ABSTRACT

Methods and apparatus are provided. In an example aspect, a method of managing data storage in a communication system is provided. The communication system includes a plurality of clusters of network nodes, and the network nodes in each cluster of network node include one or more data storage nodes. The method comprises receiving data to be stored from a data source node, generating, from the data to be stored, a first subset of erasure coded chunks, causing the first subset of erasure coded chunks to be stored in one or more of the data storage nodes in at least one first cluster of the plurality of clusters, and sending, to a second cluster of the plurality of clusters, the data to be stored.

5 Claims, 13 Drawing Sheets

(56)        References Cited

U.S. PATENT DOCUMENTS

| | | | | |
|---|---|---|---|---|
| 2017/0371571 | A1 | 12/2017 | Danilov et al. | |
| 2018/0039543 | A1* | 2/2018 | Luby | G06F 3/067 |
| 2020/0004447 | A1* | 1/2020 | Danilov | G06F 3/0638 |
| 2020/0012442 | A1* | 1/2020 | Yang | G06F 3/067 |
| 2020/0201827 | A1* | 6/2020 | Chacko | G06F 16/1824 |
| 2021/0133049 | A1 | 5/2021 | Danilov et al. | |
| 2021/0152364 | A1* | 5/2021 | Beecham | G06F 16/27 |
| 2021/0218571 | A1 | 7/2021 | Ansari et al. | |
| 2021/0397359 | A1* | 12/2021 | Richardson | G06F 11/1076 |
| 2024/0283705 | A1* | 8/2024 | Mouradian | H04L 43/0876 |
| 2024/0348685 | A1* | 10/2024 | Szabó | G06F 3/067 |

OTHER PUBLICATIONS

Dimakis et al., Decentralized Erasure Codes for Distributed Networked Storage, 2006, IEEE, pp. 1-8. (Year: 2006).*

Author Unknown, "STORJ: A Decentralized Cloud Storage Network Framework," Version 3.0, Oct. 30, 2018, Storj Labs, Inc, 90 pages.

Khemani, "Erasure Coding for The Masses," Towards Data Science, Dec. 21, 2020, 31 pages.

Lakshman, et al., "Cassandra—A Decentralized Structured Storage System," ACM SIGOPS Operating Systems Review, Apr. 2010, 7 pages.

Reed, et al., "Polynomial Codes Over Certain Finite Fields," Journal of the Society for Industrial and Applied Mathematics, vol. 8, Issue 2, Jun. 1960, JSTOR, 6 pages.

Vorick, et al., "Sia: Simple Decentralized Storage," Nov. 29, 2014, 8 pages.

International Search Report and Written Opinion for International Patent Application No. PCT/EP2021/078699, mailed Jul. 6, 2022, 10 pages.

Examination Report for Indian Patent Application No. 20241702645, mailed Oct. 9, 2025, 7 pages.

* cited by examiner

100

200

500

700

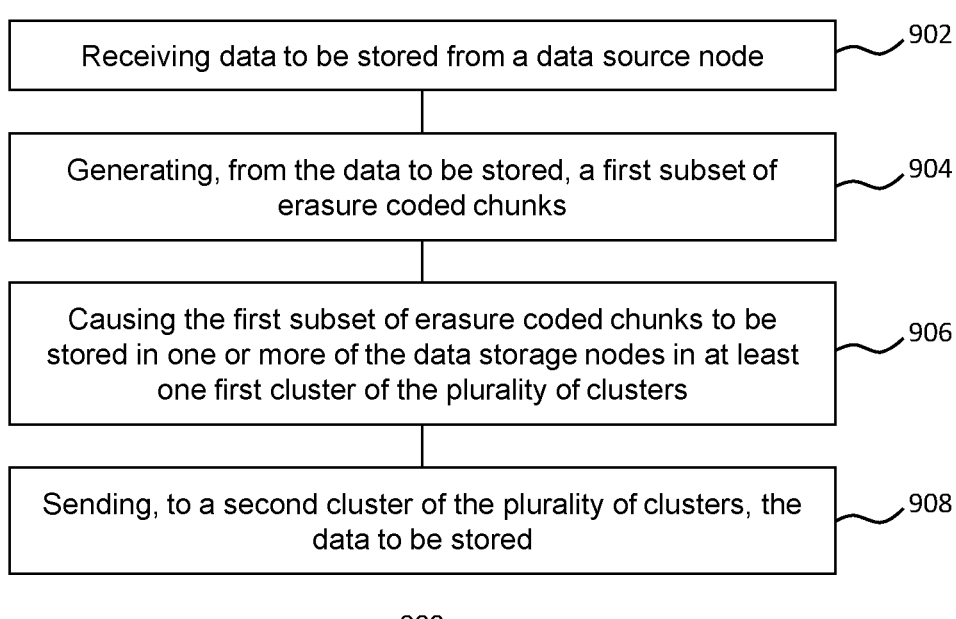

Receiving data to be stored from a data source node — 902

Generating, from the data to be stored, a first subset of erasure coded chunks — 904

Causing the first subset of erasure coded chunks to be stored in one or more of the data storage nodes in at least one first cluster of the plurality of clusters — 906

Sending, to a second cluster of the plurality of clusters, the data to be stored — 908

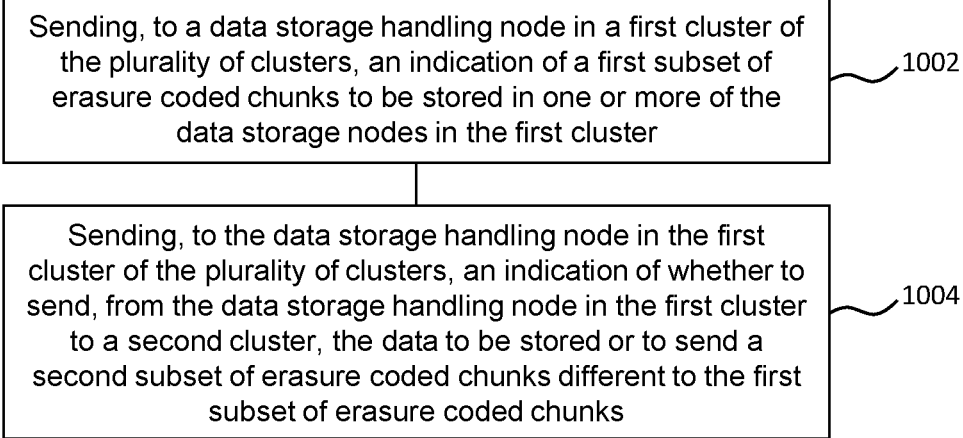

Sending, to a data storage handling node in a first cluster of the plurality of clusters, an indication of a first subset of erasure coded chunks to be stored in one or more of the data storage nodes in the first cluster — 1002

Sending, to the data storage handling node in the first cluster of the plurality of clusters, an indication of whether to send, from the data storage handling node in the first cluster to a second cluster, the data to be stored or to send a second subset of erasure coded chunks different to the first subset of erasure coded chunks — 1004

MANAGING DATA STORAGE IN A COMMUNICATIONS SYSTEM

This application is a 35 U.S.C. § 371 national phase filing of International Application No. PCT/EP2021/078699, filed Oct. 15, 2021, the disclosure of which is incorporated herein by reference in its entirety.

TECHNICAL FIELD

Examples of the present disclosure relate to managing data storage in a communications system.

BACKGROUND

Decentralized storage solutions are proposed in various solutions like Tardigrade or Sia, as disclosed in C. H. G. von Heyden, "Sia: Simple Decentralized Storage," David Vorick, vol. 16, pp. 368-370, Nov. 29, 2014, which is incorporated herein by reference. These products use crowd-source capacity to offer an encrypted and reliable storage service. By means of these products, spare capacity of individuals (and businesses) is collected and sold to anyone who needs a storage solution. Capacity providers, as well as the capacity consumers, are connected to each other via the internet, over operators' already established connectivity networks.

Storj, as disclosed in "Storj: Decentralized cloud storage," V3.0, Oct. 30, 2018, https://www.storj.io/storjv3.pdf, which is incorporated herein by reference, is the underlying decentralized storage solution system of Tardigrade. This solution separates the supply (storage capacity) and the demand (storage need), and serves developers who want to rent a safe and scalable storage space. This solution handles and coordinates the spare capacity of storage node operators. In "Storj: Decentralized cloud storage", a threefold architecture is proposed, as shown in FIG. 1, which shows an example of a decentralized storage system 100.

In the decentralized storage system 100, storage nodes 102 represent the spare capacity of individuals and businesses. Any device can join the system 100 in order to offer its spare capacity to other devices. As the devices with spare capacity are connected to the system 100, the system will start to utilize their free capacity by uploading data and compensate the device owners or their network operators with credit or money. Customer application 104 represents the demand side. After registering to the system, any device can start to upload data into the system based on an Application Programming Interface (API) key generated at the customer application 104. With the key, one can connect the uplink Command Line Interface (CLI) to the system 100, represented in FIG. 1 also by satellites 106. Satellites 106 represent a central coordinator entity in the system 100. The satellites have knowledge of multiple metrics about the storage nodes 102, while also being aware of the storage structure of users' data. Because data (which may be sensitive) is stored at a device other than a device that originally provided the data to be stored, encrypting the data as early as possible is crucial. The upload facility that uploads the data to the storage system, from the device that originally provides the data to be stored, has a built-in encryption with an erasure coding that prevents reading the data after the data leaves the device from which it was originally provided.

FIG. 2 shows an example of communications 200 within a Storj decentralized data storage system, such as the system 100 shown in FIG. 1. In particular, FIG. 2 shows an example of how data is uploaded to the storage nodes. First, the upload facility in the client device 202 that is storing data contacts a satellite 204 of the storage system to notify it about an upload request to upload data (the prepare step 206 in FIG. 2). The satellite 204 will reply to the client 202 with the location (e.g. IP address) of storage nodes 208 where the data can be stored (the unrestricted allocation step 210). The number of these storage nodes depends on the system configuration, such as the resiliency and storage overhead. The selection of storage nodes, however, is based on the storage node reputation calculated by four subsystems:

1. As storage nodes connect to the system, they are in a proof of work stage. This practically means that before connecting storage capacity, the node operator must perform a hard computational problem. This helps the network avoid some Sybil attacks. The difficulty of the proof of work is configured in the satellite.

2. After joining to the system 100, storage nodes are unknown and not trusted. The next phase is a vetting process, that runs until enough data is collected about the node. When some data is uploaded, the system 100 selects already trusted storage nodes according to a satellite configuration, and besides these already trusted nodes, some storage nodes in vetting stage are selected. This way the system 100 can collect metrics from a new storage node without jeopardizing the required resiliency level.

3. The third subsystem filters (blocks) bad storages nodes. Some examples that makes a node blocked are failing too many audits; failing to return data with reasonable speed; and failing too many uptime checks. A blocked node must return to the vetting process again.

4. The last subsystem selects well-behaving storage nodes based on preference values. Such preference values are throughput, latency, history of reliability and uptime, and geographic location of the storage node. The selection is based on a process called power of two choices, which selects two nodes entirely at random, and then chooses the more qualified between those two.

After encryption and erasure coding the data is split into blocks. The PUT and DATA messages 212 shown in FIG. 2 show that a collection of data blocks is stored in one storage node.

SUMMARY

Current decentralized solutions execute both encryption and erasure coding at the client side, and the encrypted and encoded data is then transferred to the storage nodes. Thus, a client application will upload the expansion factor times the original data volume.

One aspect of the present disclosure provides a method of managing data storage in a communication system. The communication system includes a plurality of clusters of network nodes, and the network nodes in each cluster of network node include one or more data storage nodes. The method comprises receiving data to be stored from a data source node, generating, from the data to be stored, a first subset of erasure coded chunks, causing the first subset of erasure coded chunks to be stored in one or more of the data storage nodes in at least one first cluster of the plurality of clusters, and sending, to a second cluster of the plurality of clusters, the data to be stored.

Another aspect of the present disclosure provides a method of managing data storage in a communication system. The communication system includes a plurality of clusters of network nodes, and the network nodes in each cluster of network nodes include one or more data storage nodes. The method comprises sending, to a data storage handling node in a first cluster of the plurality of clusters, an indication of a first subset of erasure coded chunks to be stored in one or more of the data storage nodes in the first cluster, and sending, to the data storage handling node in the first cluster of the plurality of clusters, an indication of whether to send, from the data storage handling node in the first cluster to a second cluster, the data to be stored or to send a second subset of erasure coded chunks different to the first subset of erasure coded chunks.

A further aspect of the present disclosure provides apparatus for managing data storage in a communication system. The communication system includes a plurality of clusters of network nodes, and the network nodes in each cluster of network node include one or more data storage nodes. The apparatus comprises a processor and a memory. The memory contains instructions executable by the processor such that the apparatus is operable to receive data to be stored from a data source node, generate, from the data to be stored, a first subset of erasure coded chunks, cause the first subset of erasure coded chunks to be stored in one or more of the data storage nodes in at least one first cluster of the plurality of clusters, and send, to a second cluster of the plurality of clusters, the data to be stored.

A still further aspect of the present disclosure provides apparatus for managing data storage in a communication system. The communication system includes a plurality of clusters of network nodes, and the network nodes in each cluster of network node include one or more data storage nodes. The apparatus comprises a processor and a memory. The memory contains instructions executable by the processor such that the apparatus is operable to send, to a data storage handling node in a first cluster of the plurality of clusters, an indication of a first subset of erasure coded chunks to be stored in one or more of the data storage nodes in the first cluster, and send, to the data storage handling node in the first cluster of the plurality of clusters, an indication of whether to send, from the data storage handling node in the first cluster to a second cluster, the data to be stored or to send a second subset of erasure coded chunks different to the first subset of erasure coded chunks.

An additional aspect of the present disclosure provides apparatus for managing data storage in a communication system. The communication system includes a plurality of clusters of network nodes, and the network nodes in each cluster of network node include one or more data storage nodes. The apparatus is configured to receive data to be stored from a data source node, generate, from the data to be stored, a first subset of erasure coded chunks, cause the first subset of erasure coded chunks to be stored in one or more of the data storage nodes in at least one first cluster of the plurality of clusters, and send, to a second cluster of the plurality of clusters, the data to be stored.

Another aspect of the present disclosure provides apparatus for managing data storage in a communication system. The communication system includes a plurality of clusters of network nodes, and the network nodes in each cluster of network node include one or more data storage nodes. The apparatus is configured to send, to a data storage handling node in a first cluster of the plurality of clusters, an indication of a first subset of erasure coded chunks to be stored in one or more of the data storage nodes in the first cluster, and send, to the data storage handling node in the first cluster of the plurality of clusters, an indication of whether to send, from the data storage handling node in the first cluster to a second cluster, the data to be stored or to send a second subset of erasure coded chunks different to the first subset of erasure coded chunks.

In some examples, by separating encryption and erasure coding and moving the erasure coding to a cluster of network nodes such as an operator's network, data sent from a data source such as a client application to the cluster may be reduced compared to if the erasure coded chunks are sent by the data source instead. This reduction in data volume may be especially beneficial in the case of a mobile user to reduce traffic over the radio network. Certain examples may also reduce traffic on bottleneck links in an operator region or between operators based on policies. Furthermore, examples may provide improvements in terms of computation and communication efficiency.

BRIEF DESCRIPTION OF THE DRAWINGS

For a better understanding of examples of the present disclosure, and to show more clearly how the examples may be carried into effect, reference will now be made, by way of example only, to the following drawings in which:

FIG. 9 is a flow chart of an example of a method of managing data storage in a communication system;

FIG. 10 is a flow chart of another example of a method of managing data storage in a communication system;

DETAILED DESCRIPTION

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry.

Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

There is no official definition of distributed and decentralized storage systems, and thus these terms may be used herein in some examples based on the following definitions. A decentralized storage system may aggregate and coordinate storage capacity from many different locations all over the world. A distributed storage system may store data over several servers and locations, however these servers are managed by a single entity (e.g. a company). A distributed storage system may assume that the storage nodes in the system are only unavailable upon rare failure events or during a scheduled maintenance. Example embodiments of this disclosure may instead be implemented using decentralized storage systems, where storage nodes may be operated by "untrusted" entities and may become unavailable often and without any notice.

As suggested above, prior decentralized storage systems may generate a large amount of data traffic that transits between operator networks, thereby causing congestion on network links or demanding from network operators such as the installation of additional equipment.

Figure 1:
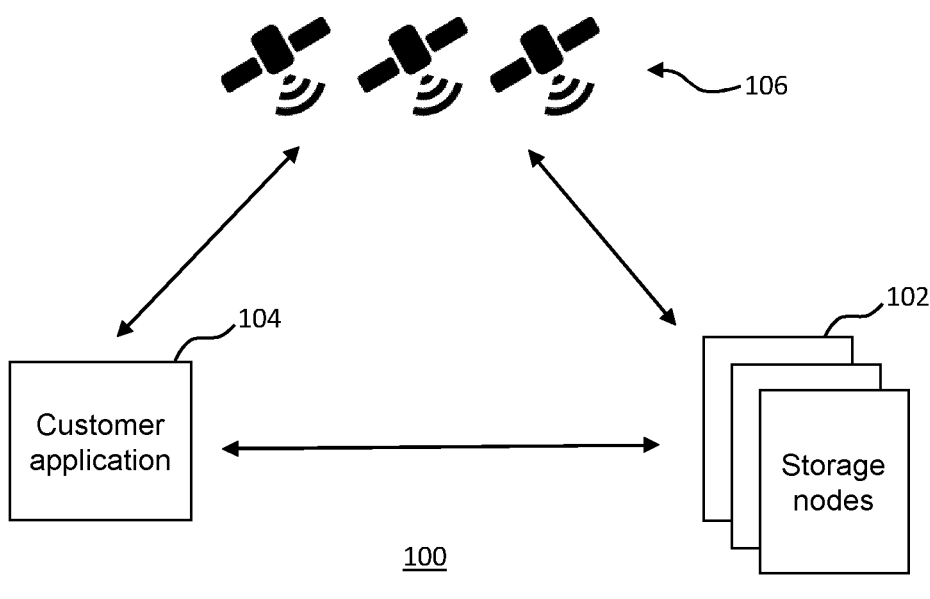
FIG. 1 shows an example of a decentralized storage system.
Figure 2:
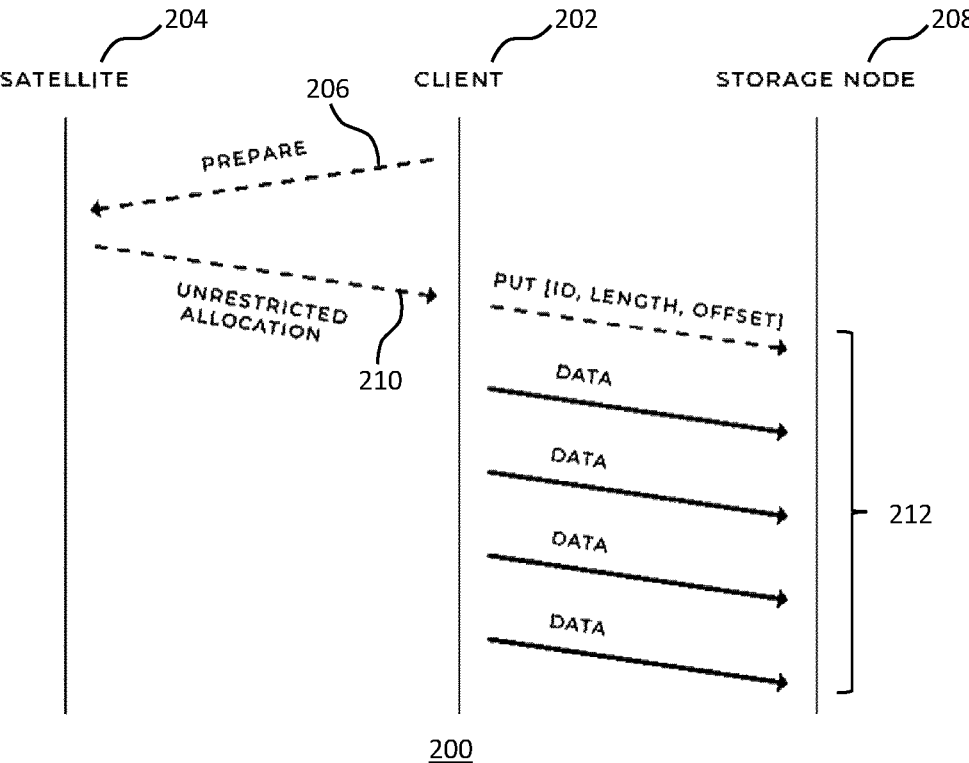
FIG. 2 shows an example of communications within a decentralized data storage system.
Figure 3:
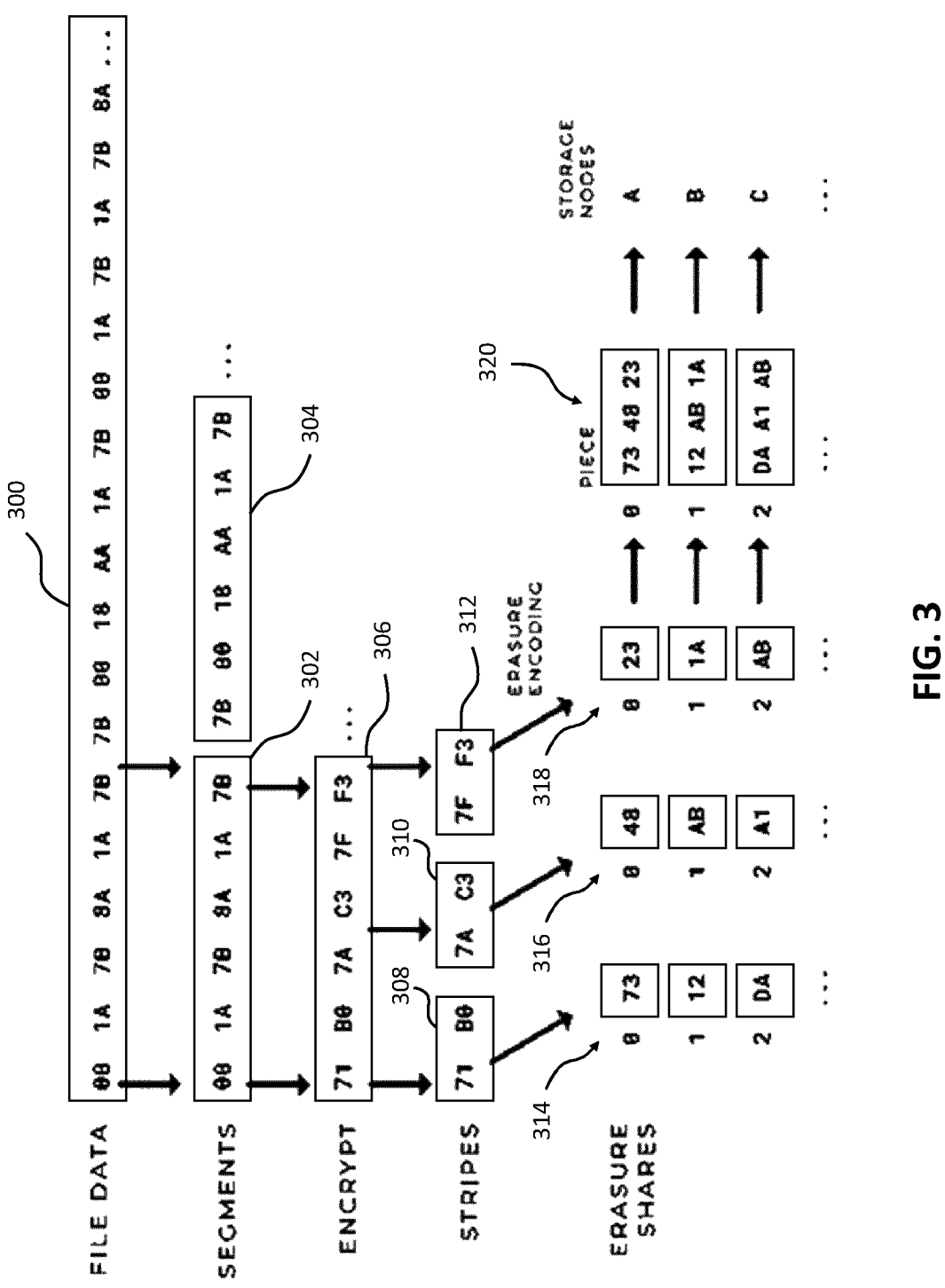
FIG. 3 shows an example of how data is uploaded to storage nodes in a decentralized data storage system.

FIG. 3 shows an example of how data (e.g. file data 300) is uploaded to the storage nodes in a decentralized data storage system, and in particular shows an example of how encryption and erasure coding may be performed. First, the file data 300 is encrypted. This is performed by splitting the file data 300 into segments. Two segments 302 and 304 of six bytes each are shown in FIG. 3, though in other examples there may be any number of segments of any size, and the segments may be all the same size (with the possible exception of the final segment) or varying sizes in some examples. Encryption is then performed on each segment separately to produce encrypted segments. In the example shown, an encrypted segment 306 is formed from unencrypted segment 302. The encrypted data is then further broken down into stripes. In the example shown, each encrypted segment 306 is split into three stripes 308, 310 and 312 of two bytes each, although in other examples there may be any number of segments of any suitable size from each encrypted segment. Each stripe is transformed into a set of erasure shares (0 . . . n). For example, stripe 308 is transformed into a first set 314 of erasure shares, stripe 310 is transformed into a second set 316 of erasure shares, and stripe 312 is transformed into a third set 318 of erasure shares of one byte each. In the example shown, each two-byte stripe is transformed into a set of three one-byte erasure shares, though in other examples there may be any number of erasure shares per stripe. Here, as a two-byte stripe is transformed into a three-byte set of erasure shares by erasure coding, if all of the erasure shares are stored in a storage system, then the storage system stores 1.5× the amount of data compared to the original data 300. Thus, the expansion factor of this example is 1.5× or 150%, as explained below.

To resiliently store data, it will always require overhead in terms of storage space. This overhead is indicated by the expansion factor, which describes how much data will be stored compared to the original data. For example, if a resiliency strategy is to store the very same file 5 times (e.g. at different locations), then our expansion factor is 5× or 500%. Storing multiple copies of the data does not guarantee total availability of the data, it just drastically lowers the probability of data loss.

When using erasure coding, identical copies of the data are not stored. Instead, the data is encoded in a way such that the original data can be recovered despite some missing pieces or chunks of the erasure coded data. Erasure coding algorithms, such as for example Reed-Solomon coding, can be described using two parameters: n is the number of pieces the data is split into, while k is the number of pieces that must be available to avoid data loss and to recover all of the original data. In the decentralized storage system, if different pieces are stored on n storage nodes, k pieces will need to be retrieved from these storage nodes to be able to recover all of the original data. Accordingly, up to n-k storage nodes can be unavailable (assuming that each storage node stores only one piece), and the original data can still be recoverable.

Referring back to FIG. 3, the erasure shares of all stripes with the same index (e.g. each stripe is transformed into erasure shares with indexes 0, 1, 2, . . . ) are bundled to form a piece, such that n pieces 320 are formed. Each of the n pieces 320 may then be sent directly to the respective one of the n storage nodes assigned by the satellite 106. The storage nodes will then store these pieces (also referred to as an example of erasure coded chunks) in their storage space. Each piece or chunk may also be indexed with a piece identification (id) sent along with the piece.

In some examples of this disclosure, encryption (which may be optional) may be performed in a node such as a client device (e.g. a device or a user equipment that is executing a client application), a client application etc., and transforming the encrypted data (or file data or segments, if no encryption is used) or stripes into erasure coded chunks or pieces may be performed in a node that is local to the storage nodes in which those pieces or chunks will be stored, e.g. within the same cluster of network nodes, or alternatively one or more of the storage nodes may be in a different cluster of nodes. Furthermore, in some examples, the original data (which may be the encrypted data, stripes, file data or segments) may be sent to another node in another cluster, whereby the other node may generate different chunks or pieces and cause those to be stored in other storage nodes. Examples of this disclosure may receive data to be stored from a device, such as a wired or wireless communication device, for example a user equipment, or any other type of device. In this disclosure, a user equipment may comprise for example a wireless or wired communications device such as a mobile phone, a smartphone, an Internet-of-Things (IoT) device, a vehicle mounted or embedded/integrated wireless device, a gaming console or device, a laptop, a tablet computer, a stationary computer etc, including a User Equipment (UE) as defined by 3GPP.

A user equipment in the form of an IoT device may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. As yet another specific example, in an IoT scenario, a user equipment may represent a machine or other device that performs monitoring and/or measurements, and transmits the results of such monitoring and/or measurements to another user equipment and/or a network node. The user equipment may in this case be a Machine-to-Machine (M2M) device, which may in a 3GPP context be referred to as a Machine Type Communication (MTC) device. As one particular example, the user equipment may implement the 3GPP Narrow Band (NB) IoT standard. In other scenarios, a user equipment may represent a vehicle, such as a car, a bus, a truck, a ship and an airplane, or other equipment that is capable of monitoring and/or reporting on its operational status or other functions associated with its operation.

Some examples of this disclosure are described whereby data to be stored is received from a user equipment, or that a client application may be executing on a user equipment. However, such examples should not be limited to the examples of user equipment provided above, and this disclosure includes alternatives to those examples. Additionally, a storage node may be any suitable type of node, such as those indicated above, e.g. a wired or wireless communication device such as a user equipment, or any other type of device.

Figure 4:
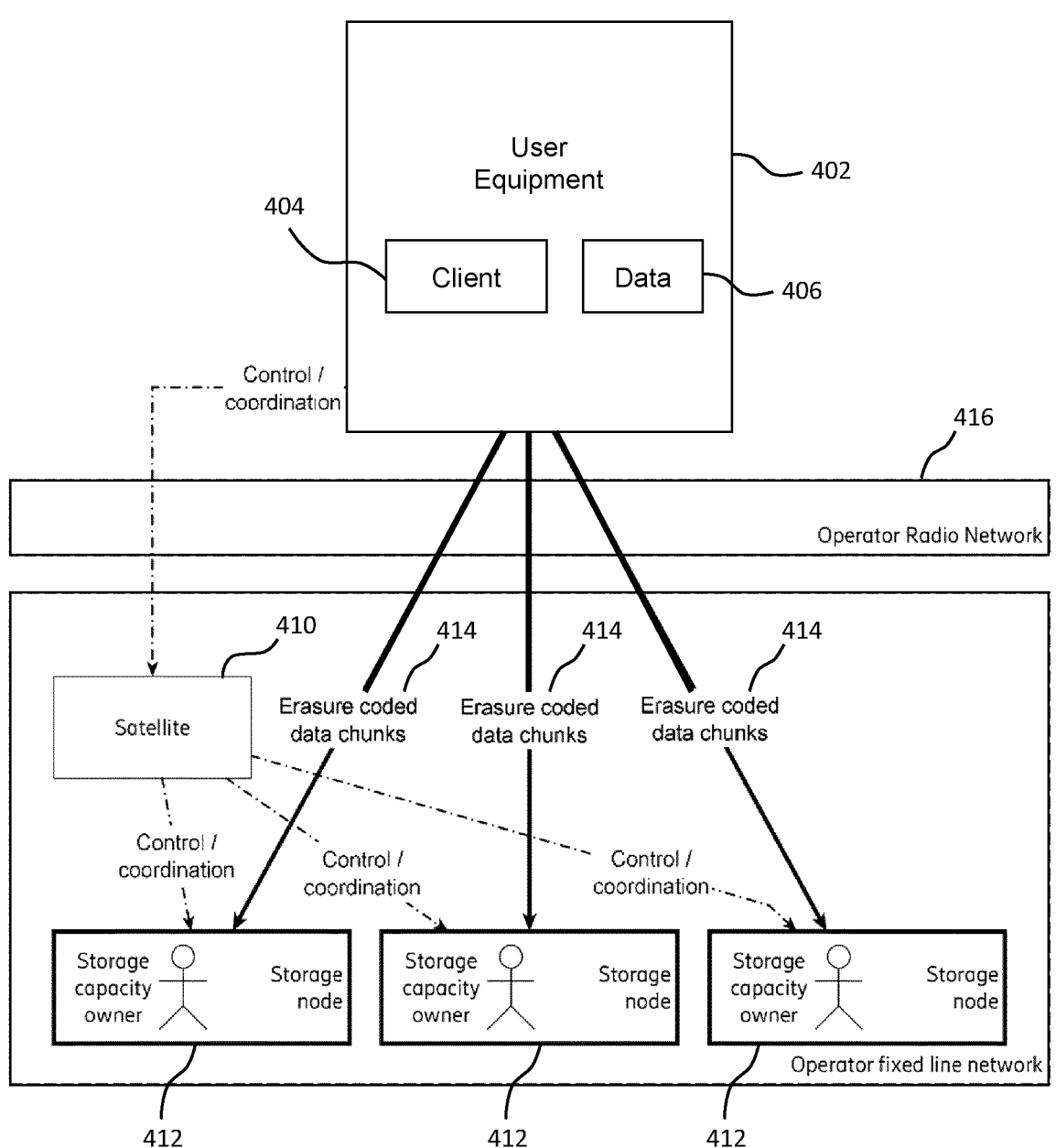
FIG. 4 shows an example of a file upload process in a Storj storage system.

FIG. 4 shows an example of a file upload process in a Storj storage system, as described for example in "Storj: A Decentralized Cloud Storage Network Framework," Storj Labs, Inc, Oct. 30, 2018, v3.0, https://github.com/stori/ whitepaper, which is incorporated herein by reference. When a data upload is initiated, for example by a user equipment 402 that is executing an application referred to as a client application 404, the unencrypted data 406 is encrypted with the user's key and erasure coded, for example as described above with reference to FIG. 3. This step augments the data volume with the expansion factor of the storage system. The client application 404 then requests n storage nodes from the satellite 410, which provides an indication of storage nodes 412. The client application 404 then sends each erasure coded chunk 414 to its assigned storage node 412 via an operator radio network 416 to which the user equipment 402 is connected. Herein, an indication may be a piece of information, such as in JavaScript Object Notation (JSON) format, or any other suitable format, that conveys the information indicated. Additionally or alternatively, for example, where a node indicates some information or an indication, this information or indication may be included in a message from that node. Any message, information or indication sent by a node as described herein may be for example a control message or a message of any suitable type. Suitable types for indicating information or an indication in a message may include, for example, HTTP or HTTPS PUT or POST messages, or other message types. In particular examples, the transport coding used for a message could be Transmission Control Protocol (TCP) or User Datagram Protocol (UDP). If TCP is used, then a message could for example be wrapped with REST/HTTP remote procedure calls, for example, messages could be sent as PUT messages. A message may be sent using HTTP or HTTPs depending on security requirements. Another approach for sending messages could be, for example, using Google Protocol Buffer and remote procedure call invocation.

As indicated above, current decentralized solutions will upload the expansion factor times the original data volume. Thus, for example, three or more times the original data volume is sent from the client over its access link, such as the link to the operator radio network 416 shown in FIG. 4, to the decentralized storage system.

Examples of this disclosure may mitigate or address one or more of the problems disclosed herein. For example, disclosed embodiments may spatially separate encryption and erasure coding, for example such that encryption (if any) is performed in the client application and erasure coding is performed in another node, such as for example within a mobile operator's network or within a cluster of nodes. Examples of this disclosure may also send the original data to another cluster of nodes for storing certain erasure coded data chunks in the other cluster, and may in some examples send those erasure coded data chunks if their data volume is smaller than the data volume of the original data.

Some examples of this disclosure may comprise a decentralized cloud storage solution with four components. A client component (or data source) may upload, download and share data, e.g. data to be stored (encrypted or unencrypted). Storage nodes are components that store erasure coded data chunks. A coordinator component, also referred to as a data storage control node, may perform coordination between clients and storage nodes. Finally, a data storage handling node (e.g. an operator proxy) may perform erasure coding of the original encrypted or unencrypted data, and upload erasure coded data chunks to storage nodes.

In some examples, encryption and erasure coding during the data upload phase may be separated such that the client performs the encryption and then sends the encrypted data to a data storage handling node. The erasure coding is performed by the data storage handling node. Finally, the data storage handling node distributes the data chunks generated by the encoding to the storage nodes. In some examples, the data storage handling node generates only a subset of erasure coded chunks, and stores those in storage nodes. For other chunks, the data storage handling node may generate and send those chunks to other data storage nodes in a different cluster to the data storage handling node, or alternatively the data storage handling node may send the original data (which may be encrypted) to the other cluster, e.g. to another data storage handling node in the other cluster. In this way, the other data storage handling node may generate at least some of the remaining erasure coded chunks and cause those to be stored in storage nodes.

Sending the original (possibly encrypted) data between clusters (e.g. between data storage handling nodes) instead of erasure coded chunks may also save communication resources, and hence may improve performance or reduce load. This may be a benefit for example if the aggregated size of the chunks that would otherwise be sent between clusters is larger than the original data. This may also assume for example that each cluster (e.g. the data storage handling node in each cluster) is capable of erasure coding the same data with the same initial encoding vector. This way, any k data chunks of the n stored data chunks can be used to recover the original data.

Figure 5:
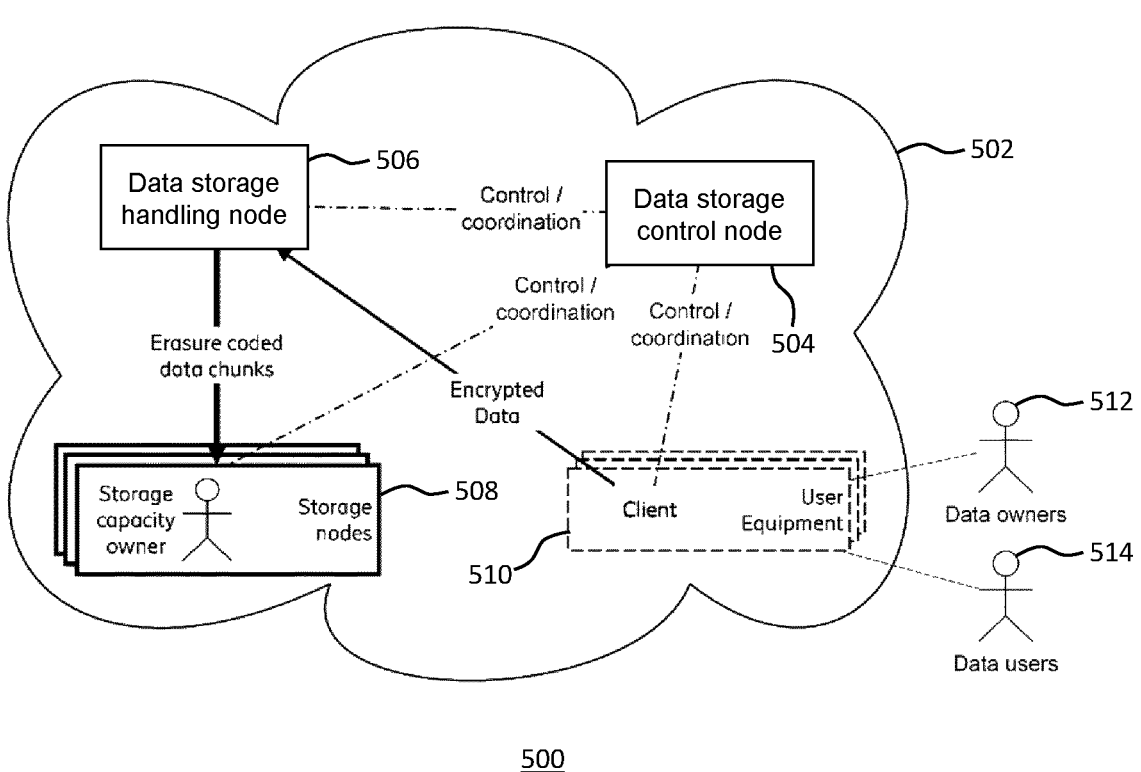
FIG. 5 shows an example of a decentralized storage system according to an example of this disclosure.

FIG. 5 shows an example of a decentralized storage system 500 according to an example of this disclosure. The system 500 includes a cluster of nodes 502, which in this example is an operator network. A cluster of nodes may comprise a plurality of network connected nodes that are operated by a single operator. In some examples, an operator may operate a plurality of clusters of nodes. The operator network 502 shown in FIG. 5 includes a data storage control node 504, data storage handling node 506, one or more storage nodes 508 (owned by one or more storage capacity owners) and one or more user euipments 510, each of which may execute a client application. Data owners 512 may be users that provide data to be stored in the decentralized storage system 500. Additionally or alternatively, data users 514 may be users that wish to retrieve data from the system 500. In some examples, one or more data owners 512 may also be data users 514.

The client application executing on a user equipment 510 is an application (e.g. mobile or native application, or web or cloud based application) that allows one group of users (e.g. data owners 512) to interact with the system 500. Through the client, data owners 512 can upload data (which may be in the form of, for example, files, photos, audio files, video files, documents, etc) which then will be stored in the storage nodes 508 of the system 500. The data owners 512 can also download the data they uploaded. If the data is to be stored in the system 500 in encrypted form, the client is preferably responsible for encryption of the data before it is stored in the system 500.

The system 500 offers storage by aggregating spare storage capacity, for example at businesses and individuals' devices (i.e. storage nodes 508). Any device or user, who has free capacity and is connected to a network such as the operator network 502 and/or the Internet, can register its storage space to the system 500. If a storage capacity owner wishes to connect to the system 500 and provide storage capacity, the storage capacity owner shall execute an application on the device or node that is associated with the storage capacity, and register with the system 500. When the storage node is registered to the system 500, some information about it is stored in the data storage control node 504. Thus, for example, the data storage control node 504 may store, for each storage node 508, an Internet Protocol (IP) address and the amount of storage space offered by that node.

The data storage control node 504 is responsible for coordination of storage nodes 508 and clients. The data storage control node 504 may provide user authentication, billing, regular audits on storage nodes to ensure that the data is still present and the node is available, initiation of data repair, and any other suitable functions.

The system 500 also includes a data storage handling node 506, which may be for example an implementation of the data storage handling node described herein. It is responsible for erasure coding of data into erasure coded chunks, as well as uploading the chunks to the storage nodes 508. The data storage handling node 506 may for example receive data to be stored (which may be in encrypted form in some examples) from the client. The data storage handling node 506 may in some examples only store the data to be stored temporarily until the described process is complete (i.e. the erasure coded chunks have been stored in their respective storage nodes 508).

Figure 6:
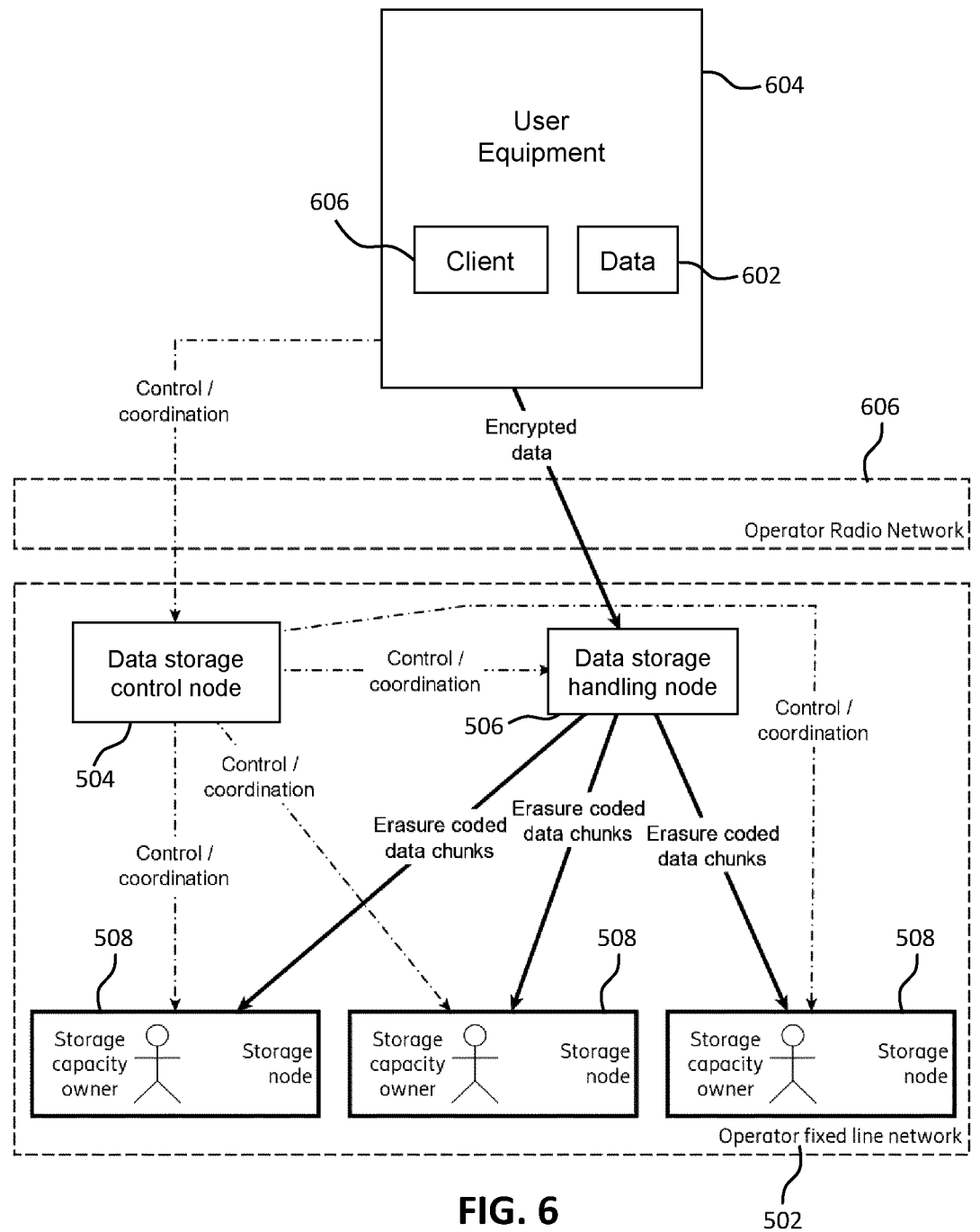
FIG. 6 shows an example of a data upload process in the decentralized storage system of FIG. 5.

FIG. 6 shows an example of a data upload process in the decentralized storage system 500 of FIG. 5. When a data upload is initiated, the unencrypted data 602 from a user equipment 604, which is executing a client application 606, is encrypted (e.g. by the uplink application 606) with asymmetric cryptographic keys to form encrypted data. Next, the client application 606 uploads the encrypted data to the data storage handling node 506 over an operator radio network 606. The size of this traffic is equal to the size of the original data (increased in some examples by any network-ing overhead). The data storage handling node 506 performs erasure coding to produce a full set of erasure coded chunks, for example using a process referred to above with reference to FIG. 3. This will result in an increased data size, as the total size of the erasure coded chunks is larger than the original data (or its encrypted version). The data storage handling node 506 then uploads each data chunk to a respective one of the storage nodes 508. The storage nodes are selected by the data storage control node 504, which may indicate to the data storage handling node 506 which storage nodes 508 are selected and how they can be reached (e.g. with an IP address). The data storage control node 504 may also for example indicate which chunk should be stored in each storage node, e.g. using an index such as the index shown in FIG. 3 (where the index of a chunk or piece is the same as the index of the erasure shares used to form that piece). In an alternative example, the data storage handling node could itself decide which chunk should go to which storage node. Then, the data storage handling node could optionally indicate to the data storage control node where each chunk is stored. In a further alternative example, data storage handling nodes in different clusters could advertise their own cluster's topology, so that data storage handling nodes can calculate the network of the data storage handling nodes and storage nodes themselves.

There may also be control/coordination messages from the data storage control node 504 to components of the system 500 as shown in FIG. 6. These may be used for example to handle coordination in the system. In some examples, there are regular ping messages from the data storage control node 504 to the storage nodes 508 to check if each storage node is still online and available. Also, regular audits may be performed to check if the erasure coded chunk is still stored in each storage node 508. Furthermore, billing information may in some examples be exchanged between the storage nodes 508 and the data storage control node 504. From the data storage control node 504 to the client application 606 in user equipment 510 there may also be messages sent that include metadata about stored data (e.g. what is stored and where). The client application 606 may obtain the address (e.g. IP address) of the data storage handling node 506 from the data storage control node 504. Control messages between the data storage control node 504 and data storage handling node 506 may in some examples consist of request and response messages related to storage node and data storage handling node selections: when the data storage handling node 506 is about to provide data chunks to storage nodes, it will ask for upload locations from the data storage control node 504, which will return the location of storage nodes and the chunk id for each. The data storage handling node 506 will send the corresponding encrypted and encoded chunks to the storage nodes.

Figure 7:
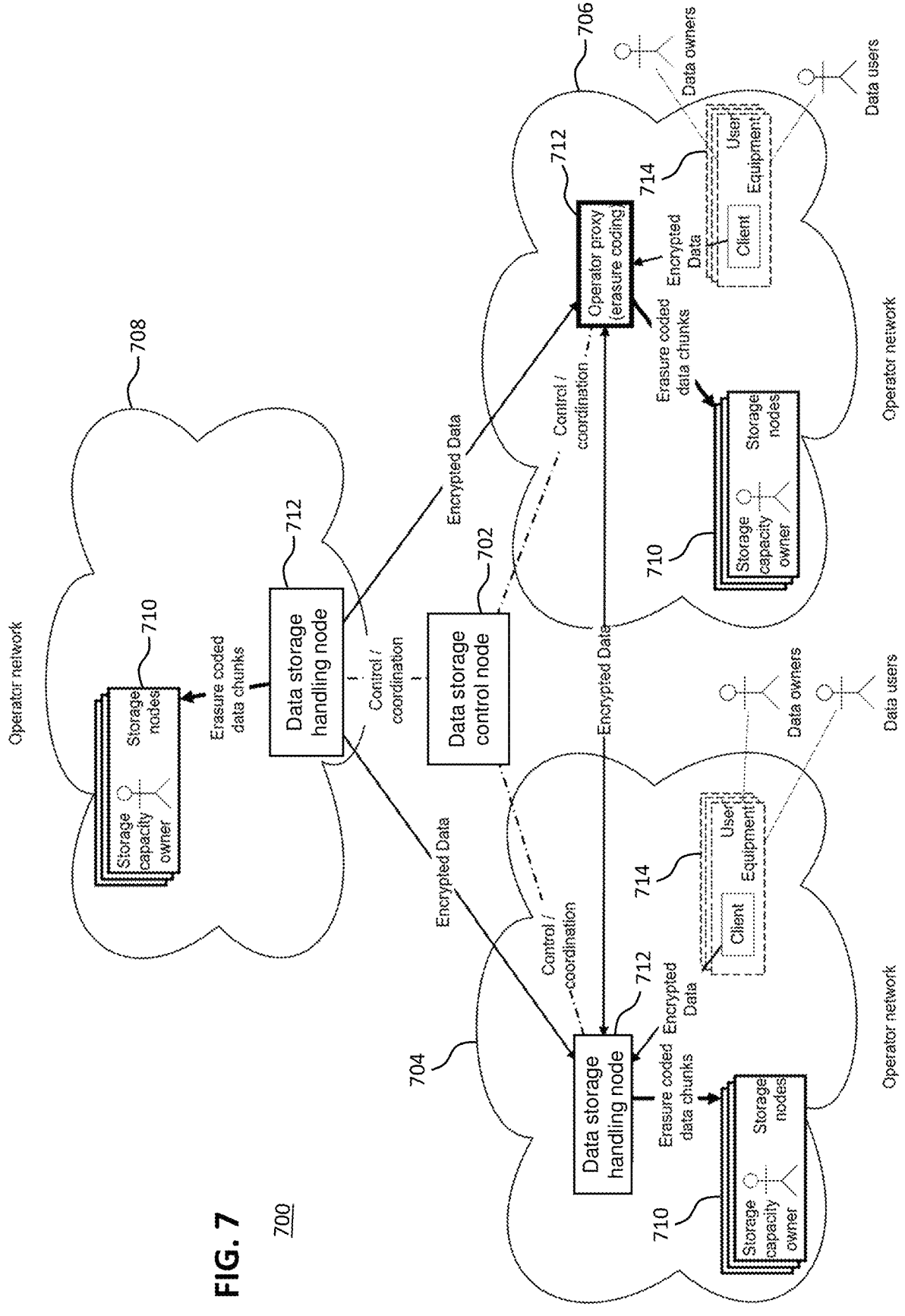
FIG. 7 shows another example of a decentralized storage system according to an example of this disclosure.

FIG. 7 shows another example of a decentralized storage system 700 according to an example of this disclosure. The system 700 includes a data storage control node 702. The system 700 also includes three clusters of nodes 704, 706 and 708, each of which in this example is an operator network. Each cluster of nodes includes one or more storage nodes 710 and a data storage handling node 712. The data storage handling node 712 may be owned or operated by the operator of the cluster or network in which it is located or to which it is connected. The clusters 704 and 707 also include one or more user equipments 714, each of which may execute a client application.

Under some circumstances as described herein, a data storage handling node, referred to as a local data storage handling node, may send the original, optionally encrypted data to at least one further data storage handling node, referred to as a remote data storage handling node, for further processing. Preferably, each data storage handling node is capable of generating the same erasure coded data chunks from the original data, and in the same order, so that the chunks can be referred to with their ordinal number. An encoding vector, known by all data storage handling nodes, can be used for this purpose. Such an encoding vector can for example be defined at configuration time and distributed to the data storage handling nodes on startup; or can be variable and be included, for example, with an upload request. In the latter case, an amended encoding vector could be sent along with the encrypted data to all of the data storage handling nodes. In one embodiment, a new, amended, encoding vector is included in each upload request. In another embodiment, a new encoding vector is signalled to the data storage handling nodes at regular intervals. An example of an encoding vector is described for example in Vishesh Khemani, "Erasure Coding For The Masses", Dec. 21, 2020, https://towardsdatascience.com/erasure-coding-for-the-masses-2c23c74bf87e, which is incorporated herein by reference. An encoding vector may be for example one row from the encoding matrix described therein, and may be specific for a chunk. In some examples, the encoding vectors may be system wide configured encoding vectors, configured per uplink or randomly selected per object. In some examples, the encoding vector used to generate erasure coded chunks for data may be stored as part of metadata for that data, and may be used for example to decode at least some of the chunks to recover the original data.

Figure 8:
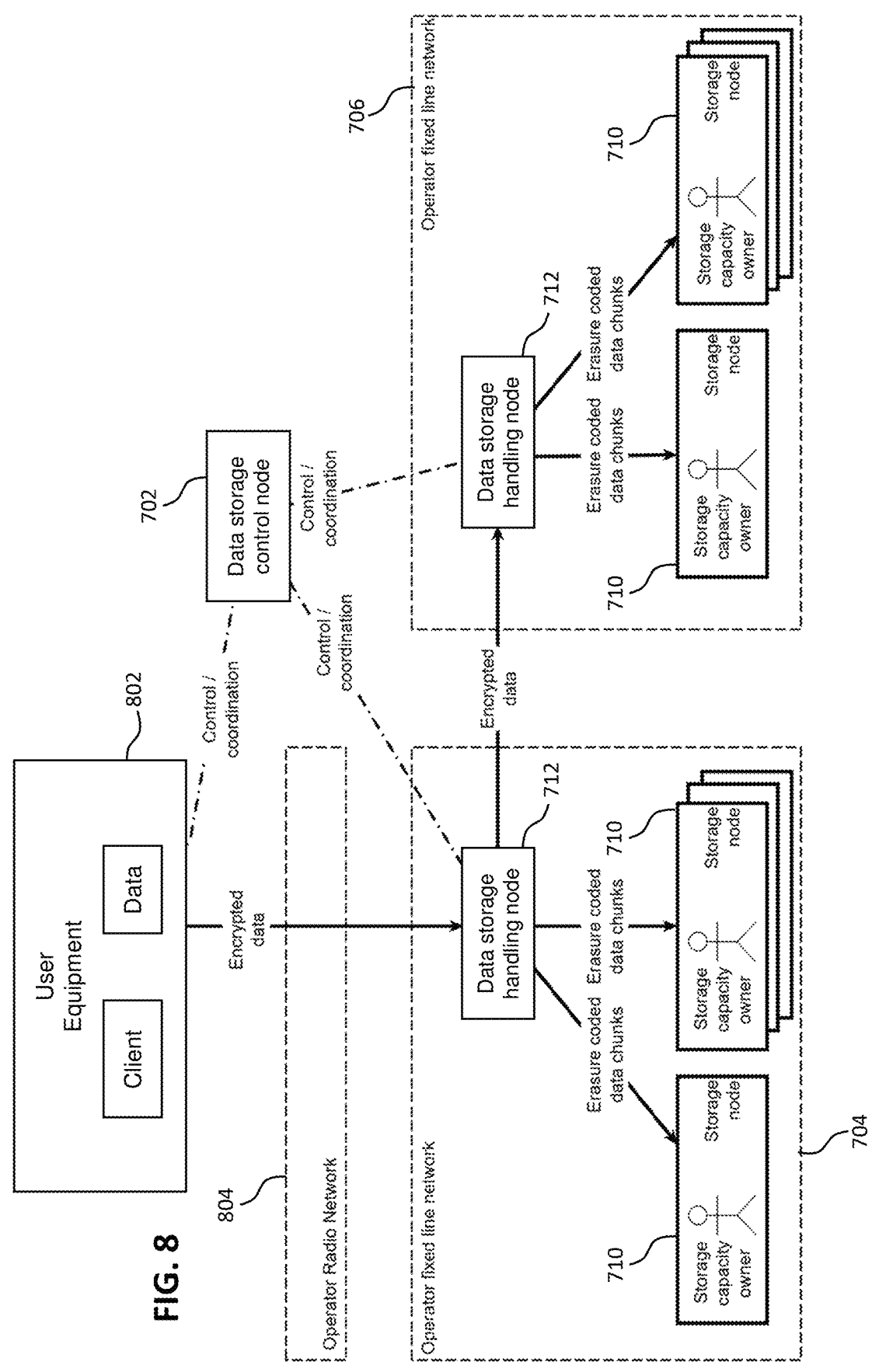
FIG. 8 shows an example of a data upload process in the decentralized storage system of FIG. 7.

FIG. 8 shows an example of a data upload process in the decentralized storage system 700 of FIG. 7. The beginning of the data upload process may in some examples be identical to the single operator scenario shown in FIGS. 5 and 6: the data is optionally encrypted by the client application in user equipment 802 and sent to the corresponding operator's data storage handling node 712. The data storage handling node 712 may be for example within a cluster 704 of nodes that includes the user equipment 802 and client application (data source), or the user equipment 802 and client application may be connected to the cluster 704, for example via an operator radio network 804.

The data storage handling node 712 then generates a first subset of erasure coded chunks and requests a set of storage nodes 710 from the data storage control node 702 to upload the data chunks to. In some examples, the set will consist of some storage nodes from the local network (e.g. from the cluster 704), and may also in some examples include some storage nodes from other clusters or remote networks, such as for example the cluster 706 or 708. The data storage handling node 712 in cluster 704 then uploads the first subset of chunks to the appropriate storage nodes indicated by coordinator 702.

In addition, the data storage handling node 712 of cluster 704 sends the original data, which may be optionally encrypted but not erasure encoded, to the data storage handling nodes of one or more other operator networks or clusters of nodes. For example, the data storage control node 702 may identify (e.g. using IP address) the data storage handling node 712 in the other cluster(s). In this way, the data storage handling node 712 in the "local" cluster 704 may send the original data (which may be encrypted in some examples) to one or more other clusters. The data storage handling node 712 in the one or more other clusters then will generate a different subset of erasure coded chunks, for example using the same encoding vector as was used to generate the first subset. That is, for example, the different subset may include erasure coded chunks from the same set as the first subset of erasure coded chunks stored in (or by) the cluster 704. The data storage control node 702 may indicate which storage nodes in their respective cluster should store those erasure coded chunks. In some examples, the data storage control node 702 may indicate to each cluster or data storage handling node which erasure coded chunks should be generated and stored in that cluster (e.g. using indexes such as those shown in FIG. 3). In some examples, the data storage control node 702 may thus ensure that a complete set of erasure coded chunks is stored.

In some examples, the data storage handling node 712 may instead send the other data chunks to the other cluster(s) instead of the original (optionally encrypted) data. The decision on what to send to other cluster(s) may be based for example on a comparison of the size of the original data versus the overall size of the erasure coded chunks that would be stored in the other cluster(s) (in some examples including the size of any overhead data that would also need to be included with the chunks sent to the other cluster(s)). Such decision could for example be taken by the data storage control node 702 and communicated to the data storage handling node 712 in a control message or by the data storage handling node 712, using any suitable message type and information format, such as for example a HTTP or HTTPS PUT or POST message and/or using JSON format, or any other suitable message type or format as suggested above.

FIG. 9 is a flow chart of an example of a method 900 of managing data storage in a communication system. The communication system (which may for example be or include the decentralized storage system 700 shown in FIGS. 7 and 8) includes a plurality of clusters of network nodes, and the network nodes in each cluster of network node include one or more data storage nodes, such as for example the storage nodes (e.g. storage nodes 710). In some examples the method 900 may be performed by a node in a cluster such as a data storage handling node.

In this disclosure, a cluster of nodes may be for example network nodes that comprise or are connected to one or more nodes in a same geographical area, one or more nodes in a same network domain, one or more nodes that are operated by a same network operator, and/or one or more nodes that are separated from other clusters of data storage nodes by one or more links that are non-preferred links, low bandwidth links, high cost links, peer links and/or transit links. Non-preferred, peer or transit links may be for example network links between clusters of nodes, such as for example ones that are operated by different network operators.

The method 900 comprises, in step 902, receiving data to be stored from a data source node. The data source node may be for example a user equipment or client application such as those described above, which may be a part of the first cluster or may be connected to the first cluster or another cluster. Alternatively, for example, the data source node may comprise a node in another cluster, such as for example a data storage handling node.

The method 900 also comprises, in step 904, generating, from the data to be stored, a first subset of erasure coded chunks. The first subset may for example comprise some but not all of the erasure coded chunks that are to be stored in the communication system for the data. Step 906 of the method 900 comprises causing the first subset of erasure coded chunks to be stored in one or more of the data storage nodes in at least one first cluster of the plurality of clusters, for example by sending each of the erasure coded chunks to a respective one of the data storage node(s) in the first cluster. In some examples, the first subset of erasure coded chunks are stored in different data storage nodes in the first cluster. Additionally or alternatively, in some examples, one or more erasure coded chunks (e.g. other than the first subset) are sent to remote data storage nodes, i.e. outside of the first cluster.

Step 908 of the method 900 comprises sending, to a second cluster of the plurality of clusters, the data to be stored.

In some examples, the method 900 comprises determining whether to send, to the second cluster, the data to be stored or a second subset of erasure coded chunks different to the first subset of erasure coded chunks. Sending, to the second cluster, the data to be stored is therefore performed in response to determining to send the data to be stored. Alternatively, for example, the method 900 may comprise sending, to the second cluster, the second subset of erasure coded chunks in response to determining to send the second subset of erasure coded chunks.

In some examples, the determination of whether to send, to the second cluster, the data to be stored or the second subset of erasure coded chunks comprises determining whether a size of the data to be stored is smaller than a size of the second subset of erasure coded chunks. Therefore, for example, sending, to the second cluster, the data to be stored is performed in response to determining that the size of the data to be stored is smaller than the size of the second subset of erasure coded chunks. Alternatively, for example, sending, to the second cluster, the second subset of erasure coded chunks may be performed in response to determining that the size of the data to be stored is larger than the size of the second subset of erasure coded chunks. Thus, for example, the smaller of the original data and the second subset of chunks is sent.

In some examples, the determination of whether to send, to the second cluster, the data to be stored or the second subset of erasure coded chunks comprises receiving an indication of whether to send, to the second cluster, the data to be stored or the second subset of erasure coded chunks from a data storage control node. The data storage control node may be for example the data storage control node 702 shown in FIGS. 7 and 8. Thus for example the data storage control node may in some examples determine which subset of chunks is stored in each cluster (such that for example a complete set is stored in all of the clusters combined), and will therefore know which chunks (or the original data) that need to be sent from the first cluster to the second cluster. In some examples, the method 900 may comprise receiving, from the data storage control node, an indication identifying the second subset of erasure coded chunks when the indication of whether to send, to in the second cluster, the data to be stored or the second subset of erasure coded chunks comprises an indication to send the second subset of erasure coded chunks.

Sending the data to be stored or a second subset of erasure coded chunks to the second cluster may in some examples cause the second subset of erasure coded chunks to be stored in the at least one data storage node in the second cluster. For example, the storage may be implemented by a data storage handling node in the second cluster. Alternatively, for example, each erasure coded chunk of the second subset of erasure coded chunks may be sent to a respective one of the at least one data storage node in the second cluster. In such examples, an identification (e.g. IP address) of each storage node in the second cluster may be received from the data storage control node.

The data storage control node 702, in examples where such a node is present, may send certain information to the entity performing the method 900, which may be for example a data storage handling node. The information may include, in some examples, at least one of an indication identifying a data storage handling node in the second cluster, an indication of the first subset of erasure coded chunks, or an indication identifying a respective storage node in the at least one first cluster for each erasure coded chunk of the first subset of erasure coded chunks.

Causing the first subset of erasure coded chunks to be stored in one or more of the data storage nodes in the at least one first cluster may in some examples comprise sending each erasure coded chunk of the first subset of erasure coded chunks to a respective one of the one or more of the data storage nodes in the at least one first cluster. For example, each chunk of the first subset may be stored in a different storage node. The storage nodes may in some examples be identified by information, such as IP addresses and chunk indexes, sent by a data storage control node. Alternatively, for example, the entity performing the method 900, e.g. a data storage handling node, may select the storage nodes for the first cluster. Similarly, in some examples, the storage nodes in the second subset may be selected by another data storage handling node (e.g. in the second cluster), or alternatively by a data storage control node.

FIG. 10 is a flow chart of another example of a method 1000 of managing data storage in a communication system. The communication system (e.g. the communication system 700 shown in FIGS. 7 and 8) includes a plurality of clusters of network nodes, wherein the network nodes in each cluster of network nodes include one or more data storage nodes. In some examples, the method 1000 is performed by a data storage control node such as those described herein. Thus, for example, the data storage control node may be those referred to above with reference to the method 900 of FIG. 9, in examples where such a node is used or present.

The method 1000 comprises, in step 1002, sending, to a data storage handling node in a first cluster of the plurality of clusters, an indication of a first subset of erasure coded chunks to be stored in one or more of the data storage nodes in the first cluster. Thus, for example, this may cause the first subset to be stored in the first cluster, e.g. each chunk may be stored in a respective storage node in the first cluster. For example, this information may be sent to an entity performing the method 900.

Step 1004 of the method 1000 comprises sending, to the data storage handling node in the first cluster, an indication of whether to send, from the data storage handling node in the first cluster to a second cluster, the data to be stored or to send a second subset of erasure coded chunks different to the first subset of erasure coded chunks.

The method 1000 may also comprise determining whether the size of the data to be stored is smaller than the size of the second subset of erasure coded chunks. Thus, for example, sending, to the data storage handling node in the first cluster, the indication of whether to send, from the data storage handling node in the first cluster to the second cluster, the data to be stored or the second subset of erasure coded chunks may for example comprise sending, in response to determining that the size of the data to be stored is smaller than the size of the second subset of erasure coded chunks, an indication to send the data to be stored. Alternatively, for example, sending, to the data storage handling node in the first cluster of the plurality of clusters, the indication of whether to send, from the data storage handling node in the first cluster to the second cluster, the data to be stored or the second subset of erasure coded chunks may comprise for example sending, in response to determining that the size of the data to be stored is larger than the size of the second subset of erasure coded chunks, an indication to send the second subset of erasure coded chunks. The indication to send the second subset of erasure coded chunks may in some examples be an indication to send the second subset of erasure coded chunks to a data storage handling node in the second cluster, or an indication to send each erasure coded chunk of the second subset of erasure coded chunks to a respective one of at least one data storage node in the second cluster.

The method 1000 may also in some examples comprise sending, to the second cluster (e.g. to a data storage handling node in the second cluster), an indication of the second subset of erasure coded chunks. This may for example cause each erasure coded chunk of the second subset of erasure coded chunks to be stored in a respective one of the one or more data storage nodes in the second cluster. An indication identifying the one or more data storage nodes in the second cluster may also be sent to the second cluster.

In some examples, the method 1000 comprises sending, to the data storage handling node in the first cluster, at least one of an indication identifying a data storage handling node in the second cluster, an indication identifying a respective storage node in the first cluster for each erasure coded chunk of the first subset of erasure coded chunks, or an indication of the first subset of erasure coded chunks.

An indication of the data to be stored may in some examples be received from a data source node, such as a node in or connected to the first cluster, or a user equipment. The indication may comprise for example an indication that the data source node wishes to store data, information about the data (e.g. the size of the data), or may be the data itself, which may be encrypted or unencrypted.

Sending, to the data storage handling node in the first cluster, the indication of a first subset of erasure coded chunks to be stored in one or more of the data storage nodes in the first cluster may in some examples cause each erasure coded chunk of the first subset of erasure coded chunks to be stored in a respective one of the one or more of the data storage nodes in the first cluster.

Figure 11:
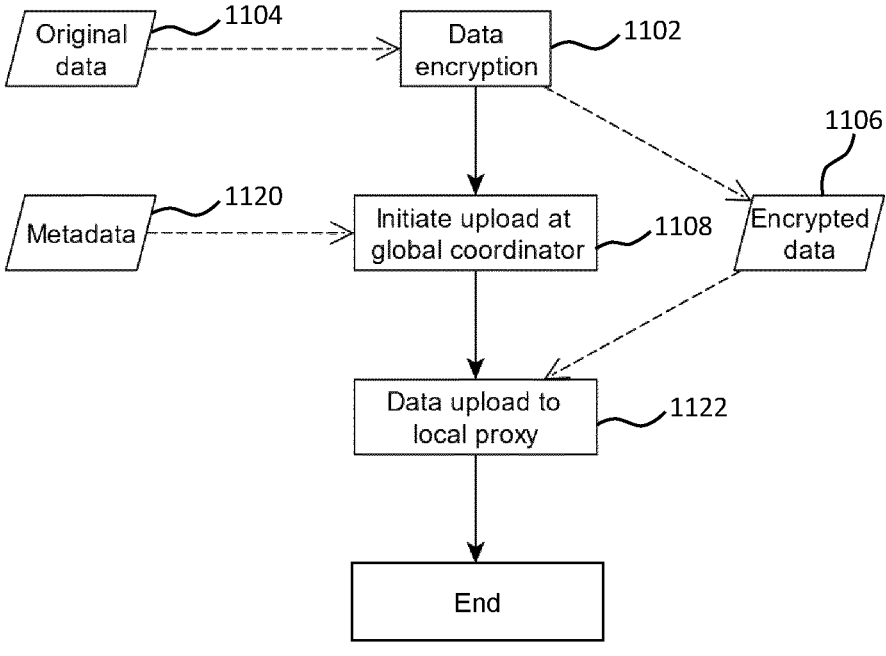
FIG. 11 is a flow chart of an example of steps performed by a client application in examples of this disclosure.

FIG. 11 is a flow chart of an example of steps performed by a client application (e.g. in a data source such as a user equipment) in examples of this disclosure. The client application may be for example a data source node as described herein, or may be executing on such a data source node. In step 1102, original data 1104 is encrypted to form encrypted data 1106, which may in some examples be of the same size as the original data 1104. In some examples, the encrypted data 1106 may be the "original data" from the point of view of other nodes in a decentralized storage system, such as the data storage handling nodes, data storage control node and/or storage nodes. In step 1108, upload at the data storage control node is initiated. This may comprise for example requesting that the encrypted data should be stored, and may also include sending metadata 1120 to the data storage control node, such as for example a file ID and file size of the data. The metadata may be generated by the client application and provided to the initiate step 1108. In step 1122, the encrypted data 1106 is uploaded to a local data storage handling node, which may be for example a data storage handling node in a cluster that contains the device or node executing the client application (or to which the device or node is connected). The local data storage handling node may in some examples be identified (e.g. by IP address) by the client application by an identifier received from the data storage control node in response to initiating the upload in step 1108. The erasure coding and the distribution of data chunks is then handled by the data storage handling node and the rest of the storage system. The client application may or may not wait for a confirmation of a successful upload.

Figure 12:
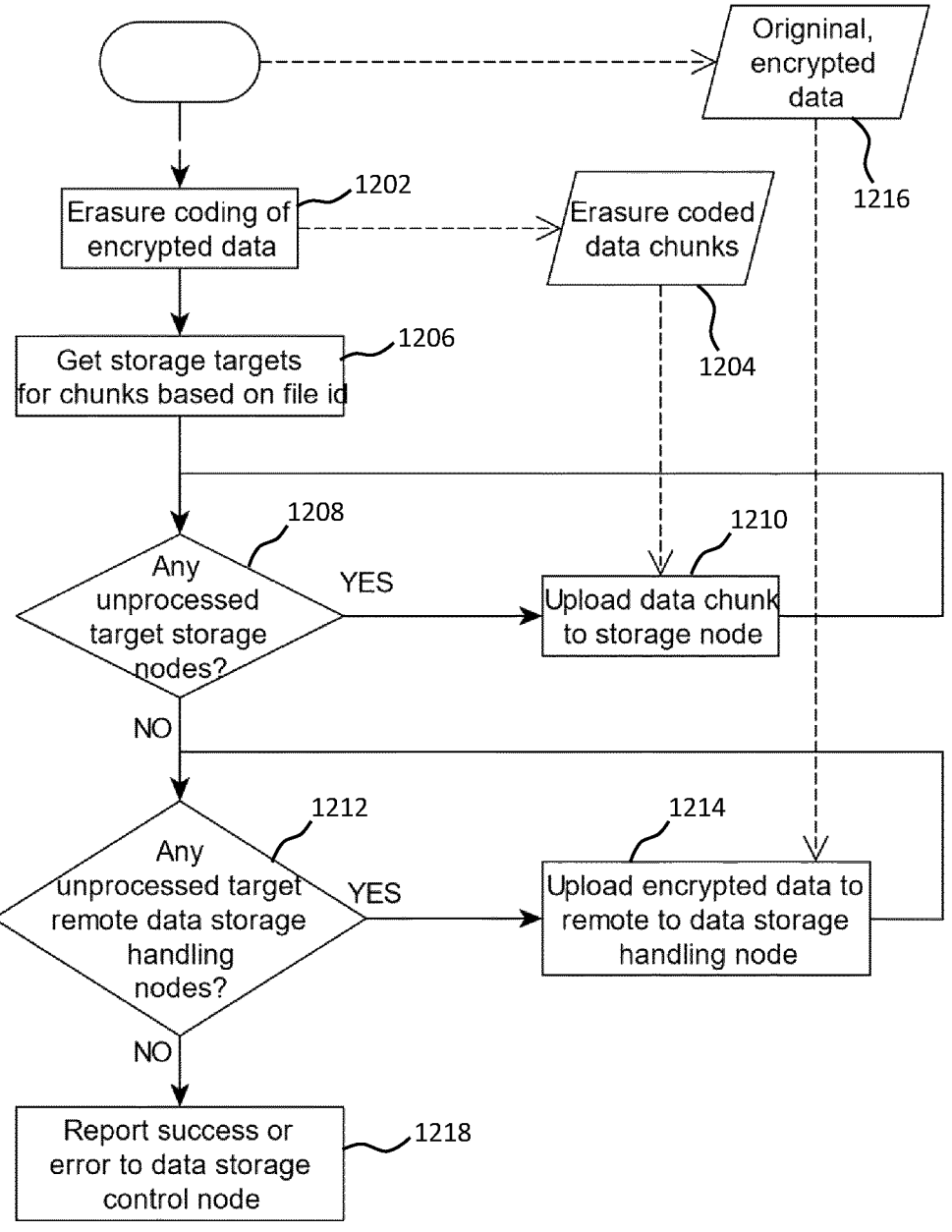
FIG. 12 is a flow chart of an example of steps performed by a data storage handling node in examples of this disclosure.

FIG. 12 is a flow chart of an example of steps performed by a data storage handling node in examples of this disclosure. These steps may be invoked for example when it receives data to be stored, for example from a client application, device or node, or alternatively for example from a data storage handling node in a different cluster. Step 1202 comprises erasure coding of the original data (which is encrypted in this example) to form a first subset of erasure coded chunks 1204. In step 1206, storage targets are obtained for the first subset of erasure coded chunks, for example based on the file id. For example, the storage targets may be identified by sending the file id to the data storage control node, and receiving the storage targets in return. This information could be e.g. in JavaScript Object Notation (JSON) format. The storage targets may be for example a storage node for each chunk in the first subset. In step 1208, it is determined if there are any unprocessed target storage nodes (i.e. storage nodes to which a data chunk for the data has not yet been uploaded). If yes, a data chunk is uploaded to a target storage node, and the target storage node is considered to be processed. Flow then returns to step 1208. If it is determined in step 1208 that there are no more unprocessed target storage nodes, then in step 1212 it is determined if there are any unprocessed target remote data storage handling nodes (i.e. remote data storage handling nodes to which the original data has not yet been uploaded). These target(s) are associated with respective cluster(s) that will store other subsets of erasure coded chunks for the same original data. If there are unprocessed target remote data storage handling nodes, in step 1214 the original (encrypted) data 1216 is uploaded to the target remote data storage handling node, which is then considered as processed. In some examples, as an alternative, if the subset of erasure coded chunk(s) to be stored in a cluster associated with the target remote data storage handling nodes are smaller in total size than the original data 1216, the subset of chunks are unloaded instead (and may also in some examples be sent directly to the appropriate storage node(s) in the other cluster instead of to the target remote data storage handling nodes). Following step 1214, flow returns to step 1212.

If in step 1212 it is determined that there are no unprocessed target remote data storage handling nodes, then in step 1218 a success or error is reported to the data storage control node. For example, success may be reported if the first subset of chunks were successfully stored in the appropriate storage nodes. If not, for example one or more of the storage nodes were unavailable or uncontactable or they returned an error (e.g. their storage was full or some other problem), then an error may be returned to the data storage control node instead.

In some examples, the data storage control node may have knowledge about the complete network topology, including connections between different clusters. Based on this information, the data storage control node may make the decision as to whether to send only the data chunks from one cluster to another, or to send the original data instead. This decision can be made based on comparing the original data size to the size of the chunks that would be sent to the next cluster. As a particular example, assume that data to be stored in a decentralized storage system is 10 MB in size, and this is sent by a data source node to an data storage handling node, which may in some examples be local to the data source node. In this example, the erasure coding is configured to create 30 chunks from the data when performing erasure coding, and thus the storage system an expansion factor of 3. As a result, after the encoding, there will be 30 data chunks, each with a size of 1 MB (though in some examples each cluster may generate only the subset of chunks to be stored in that cluster and may not generate other chunks, except if these are to be sent to another cluster). When the data storage control node selects storage nodes for the chunks, it may select one or more storage nodes from the cluster local to the data source, and some from other clusters that may be remote from the data source node. If the data storage control node selects 15 storage nodes from the local cluster, then, if the data storage handling node in the local cluster would send the erasure coded chunks to another cluster, a data volume of 15*1 MB=15 MB would be sent. Instead, the data storage control node could instruct the data storage handling node to send the original data to the data storage handling node in the other cluster, in which case only 10 MB would be sent. Then, the data storage handling node at the other cluster would perform the erasure coding itself with the same initial vector and generate at least its particular subset of chunks. The data storage handling node in the other cluster can store the generated chunks in storage nodes in that cluster. Note that these chunks are the same as those that local data storage handling node decided not to send (or rather, in the embodiment presently described, the decision was made by the data storage control node). The storage nodes where the data storage handling node in the other cluster stores the data chunks are now local to that cluster, and those chunks may thus be sent to the storage nodes using links that are not bottleneck links (or otherwise are not non-preferred, transit or peer links for example).

Figure 13:
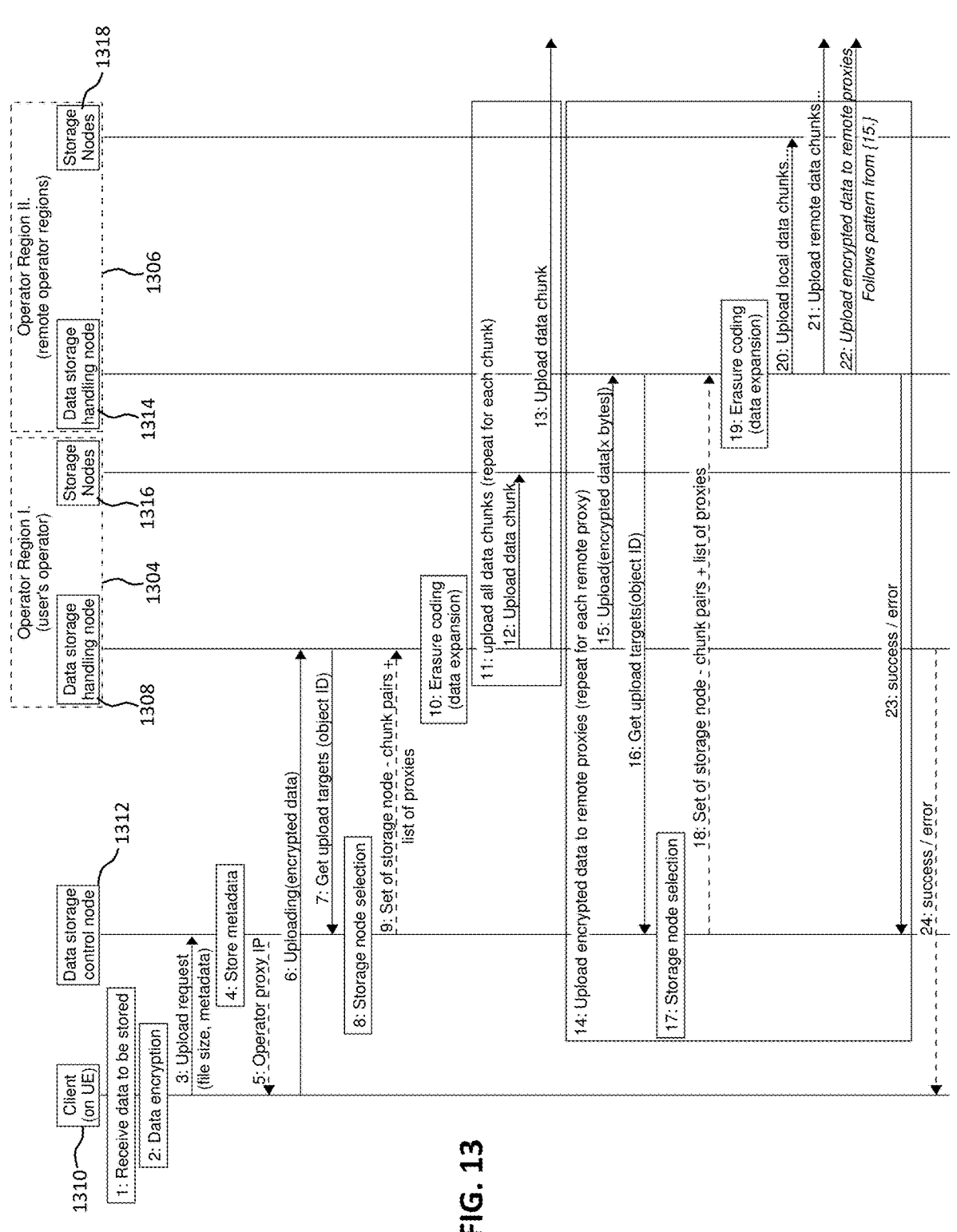
FIG. 13 shows communication between nodes in a decentralized storage system according to an example of this disclosure.

FIG. 13 shows communication between nodes in a decentralized storage system according to an example of an embodiment of this disclosure, for example when storing data. This example focuses on traffic reduction between a user equipment and an operator network 1304 (e.g. local to the user equipment), which may include or be accessed via a radio access network. In this example, the decentralized storage system comprises a data storage control node 1312. All operator regions (or clusters) 1304 and 1306 include a data storage handling node. In other examples, there may be more operator regions, including multiple regions that are remote from the user equipment. Any of the information or messages used in this example may be sent using any suitable message type and information format, such as for example those suggested above.

The process starts in step 1 of FIG. 13 with a client application 1310 executing on the user equipment receiving data to be stored. This may be received e.g. from another application on the user equipment or from storage on the user equipment. The data can be determined though a file selection on the device in the client application for example. The client application 1310 then in step 2 performs encryption of the data with the client's key which results in encrypted data that can be sent to the storage system. In some examples, the encryption key can be a per user key, but also a per object key.

After encryption, the client will contact the data storage control node 1312 in step 3 of FIG. 13 with an upload request. The address of the data storage control node 1312 may be previously shared with the client or may be obtained by the client at the same time, e.g. through a Domain Name System (DNS) lookup. Messaging between components of the system may in some examples use a representational state transfer (REST) application programming interface (API), for example with HTTP or HTTPS, although any suitable communication format may be used. In this step, the client 1310 sends initial information to the data storage control node 1312 about the data (or the file), e.g. an ID that identifies the object and/or the size of the object to help the storage node selection process, and this information may be stored in step 4 by the data storage control node 1312, for example by updating a metadata database at the data storage control node 1312. The data storage control node 1312 may also store information about the user context (e.g., location). In an alternative example, the data storage control node 1312 may generate an object ID which is returned to the client 1310, for example before step 3 and following a request from the data storage control node 1312 for an object ID for the data.

The data storage control node 1312 registers the request for the upload (based on the file id) and returns with the IP address of the data storage handling node 1308 that may be in the user's region 1304 in step 5. If there is no data storage handling node in the user's local operator region, the data storage control node 1312 may for example identify one that is accessible through the least number of bottleneck resources. However, the data storage handling node that is identified (and also identified to the client 1310) will be referred to as the local data storage handling node in this example.

In step 6, the client sends an upload request to the local data storage handling node 1308 which includes the encrypted data. The size of this data is represented by x. In the example shown, if the client is a wireless client, this is the only time that the data (x bytes) travels through the radio access network. In step 7, the local data storage handling node 1308 requests upload targets from the data storage control node 1312, e.g. referring to the object ID. The data storage control node 1312 will in step 9 return a set of storage nodes to which the data storage handling node 1308 will upload each data chunk. The data storage control node 1312 will also return a list of one or more other data storage handling nodes in one or more other regions, such as for example data storage handling node 1314 in remote region 1306.

Next, in step 10, the local data storage handling node 1308 performs the erasure coding which will result in a first subset of data chunks. The expansion factor is represented by e, and thus the total size of all erasure coded chunks will be x*e. However, the first subset may not include all of the chunks. The chunks in the first subset are then uploaded to the storage nodes 1316 in the user's operator region 1304.

In a first option, in step 11, the local data storage handling node 1308 will directly upload each data chunk of the complete set of data chunks to the appropriate storage node. In step 12, for example, the local data storage handling node 1308 uploads each chunk assigned to a storage node in the user's region 1304 to a storage node in that region. In step 13, for example, the local data storage handling node also uploads each chunk assigned to a storage node outside of the user's region 1304 to a remote region, such as for example region 1306, where the local data storage handling node 1308 uploads each chunk assigned to region 1306 to a storage node 1318 in that region. This option may be used for example where the total size of the chunks to be sent by the local data storage handling node 1308 outside of the user's region 1304 (i.e. the chunks other than the first subset) is smaller than the size x of the original data.

In a second option, in step 14 the local data storage handling node 1308 uploads each chunk assigned to a storage node in the user's region 1304 to a storage node in that region as in step 12. In addition, the local data storage handling node 1308 may upload the original (in this case encrypted) data to one or more proxies in other regions. This option may be used for example where the total size of the chunks to be sent by the local data storage handling node 1308 outside of the user's region 1304 (i.e. the chunks other than the first subset) is larger than the size x of the original data. For example, in step 15, local data storage handling node 1308 uploads the encrypted data to a remote data storage handling node 1314 in region 1306. In step 16, the remote data storage handling node 1314 obtains upload targets for a second subset of erasure coded chunks from the data storage control node 1312, similar to step 1308 but for the remote data storage handling node 1314. In step 17, the data storage control node 1312 performs storage node selection to select storage nodes 1318 in the region 1306, and identification (e.g. IP addresses) for these is returned to the remote data storage handling node 1314 in step 18. This may also in some examples contain a list of information identifying one or more further proxies, for example where the remote data storage handling node 1314 is to send the original data (or other subset(s) of chunks) to other remote data storage handling node. In step 19, the operator data storage handling node 1314 pay perform erasure coding to generate data chunks of the second subset, and may upload data chunks of the second subset to appropriate storage nodes, including storage nodes 1318. In some examples, the remote data storage handling node 1314 may also upload data chunks or encrypted data in step 20 to other regions or clusters (e.g. to one or more further data storage handling nodes in those region(s)), depending on the size of those data chunks compared to the original data size x, and any such actions may be instructed by the data storage control node 1312 using the information returned in step 18 including the list of one or more further data storage handling nodes in some examples.

In steps 21, 22 and 23, the data storage handling nodes 1308 and 1314 report back to the data storage control node 1312, and after a final result of the upload, the data storage control node 1312 reports back to the client application 1310. In an alternative example, the final reporting to the client may be performed by the local data storage handling node 1308 after the data storage control node 1312 notifies it about the success (or failure) of storage by all the other data storage handling nodes.

In some examples described above, data storage handling nodes may send data to another data storage handling node recursively. That is, for example, in FIG. 13, the remote data storage handling node 1314 may optionally send data or chunks to one or more further data storage handling nodes to cause further chunks to be stored in region(s) local to the one or more further data storage handling nodes. Similarly, examples of the method 900 described above may include sending the data or chunks to a further cluster, and this further data storage handling node may itself perform any examples of the method 900 described herein (including in some examples sending the original data or chunks to a still further cluster or data storage handling node).

Figure 14:
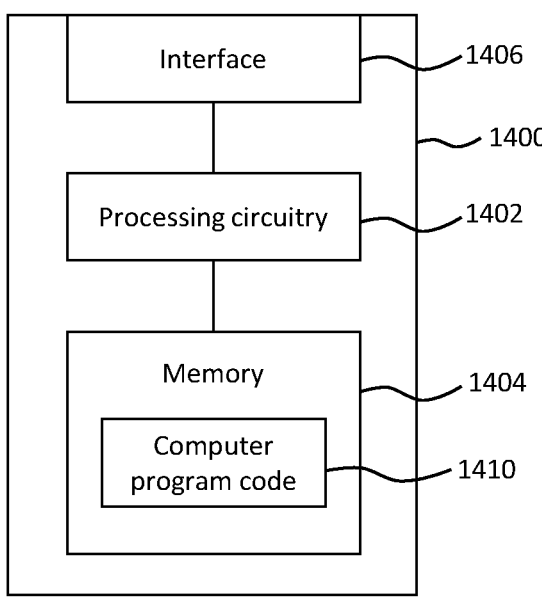
FIG. 14 is a schematic of an example of an apparatus for managing data storage in a communication system.

FIG. 14 is a schematic of an example of an apparatus 1400 for managing data storage in a communication system, wherein the communication system includes a plurality of clusters of network nodes, wherein the network nodes in each cluster of network node include one or more data storage nodes. The apparatus 1400 may in some examples comprise or be comprised in a data storage handling node, such as those described herein. The apparatus 1400 comprises processing circuitry 1402 (e.g. one or more processors) and a memory 1404 in communication with the processing circuitry 1402. The memory 1404 contains instructions, such as computer program code 1410, executable by the processing circuitry 1402. The apparatus 1400 also comprises an interface 1406 in communication with the processing circuitry 1402. Although the interface 1406, processing circuitry 1402 and memory 1404 are shown connected in series, these may alternatively be interconnected in any other way, for example via a bus.

In one embodiment, the memory 1404 contains instructions executable by the processing circuitry 1402 such that the apparatus 1400 is operable/configured to receive data to be stored from a data source node, generate, from the data to be stored, a first subset of erasure coded chunks, cause the first subset of erasure coded chunks to be stored in one or more of the data storage nodes in at least one first cluster of the plurality of clusters, and send, to a second cluster of the plurality of clusters, the data to be stored. In some examples, the apparatus 1400 is operable/configured to carry out the method 900 described above with reference to FIG. 9.

The processing circuitry 1402 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable, either alone or in conjunction with other components of apparatus 1400, such as the memory 1404, to provide the functionality of managing data storage in a communication system.

The memory 1404 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 1402. The memory 1404 may store any suitable instructions, data, or information, including a computer program, software, an application including one or more of logic, rules, code, tables, and/or other instructions capable of being executed by the processing circuitry 1402 and utilized by the apparatus 1400. The memory 1404 may be used to store any calculations made by the processing circuitry 1402 and/or any data received via the communication interface 1406. In some embodiments, the processing circuitry 1402 and memory 1404 are integrated.

Figure 15:
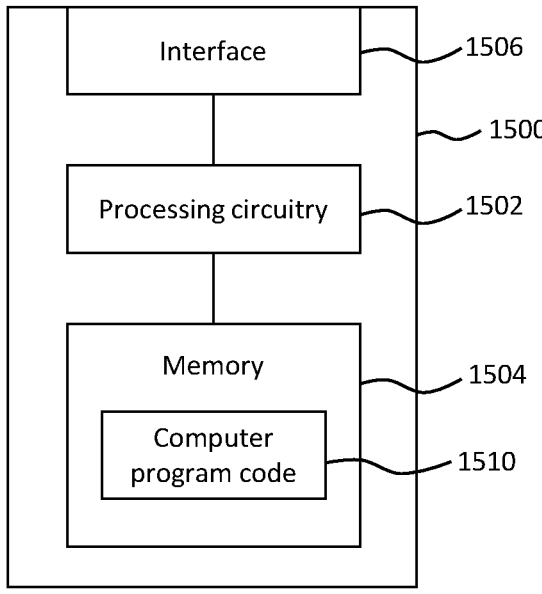
FIG. 15 is a schematic of another example of an apparatus for managing data storage in a communication system.

FIG. 15 is a schematic of an example of an apparatus 1500 for managing data storage in a communication system, wherein the communication system includes a plurality of clusters of network nodes, wherein the network nodes in each cluster of network node include one or more data storage nodes. The apparatus 1500 may in some examples comprise or be comprised in a data storage control node, such as those described herein. The apparatus 1500 comprises processing circuitry 1502 (e.g. one or more processors) and a memory 1504 in communication with the processing circuitry 1502. The memory 1504 contains instructions, such as computer program code 1510, executable by the processing circuitry 1502. The apparatus 1500 also comprises an interface 1506 in communication with the processing circuitry 1502. Although the interface 1506, processing circuitry 1502 and memory 1504 are shown connected in series, these may alternatively be interconnected in any other way, for example via a bus.

In one embodiment, the memory 1504 contains instructions executable by the processing circuitry 1502 such that the apparatus 1500 is operable/configured to send, to a data storage handling node in a first cluster of the plurality of clusters, an indication of a first subset of erasure coded chunks to be stored in one or more of the data storage nodes in the first cluster, and send, to the data storage handling node in the first cluster of the plurality of clusters, an indication of whether to send, from the data storage handling node in the first cluster to a second cluster, the data to be stored or to send a second subset of erasure coded chunks different to the first subset of erasure coded chunks. In some examples, the apparatus 1500 is operable/configured to carry out the method 1000 described above with reference to FIG. 10.

The processing circuitry 1502 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable, either alone or in conjunction with other components of apparatus 1500, such as the memory 1504, to provide the functionality of managing data storage in a communication system.

The memory 1504 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 1502. The memory 1504 may store any suitable instructions, data, or information, including a computer program, software, an application including one or more of logic, rules, code, tables, and/or other instructions capable of being executed by the processing circuitry 1502 and utilized by the apparatus 1500. The memory 1504 may be used to store any calculations made by the processing circuitry 1502 and/or any data received via the communication interface 1506. In some embodiments, the processing circuitry 1502 and memory 1504 are integrated.

Figure 16:
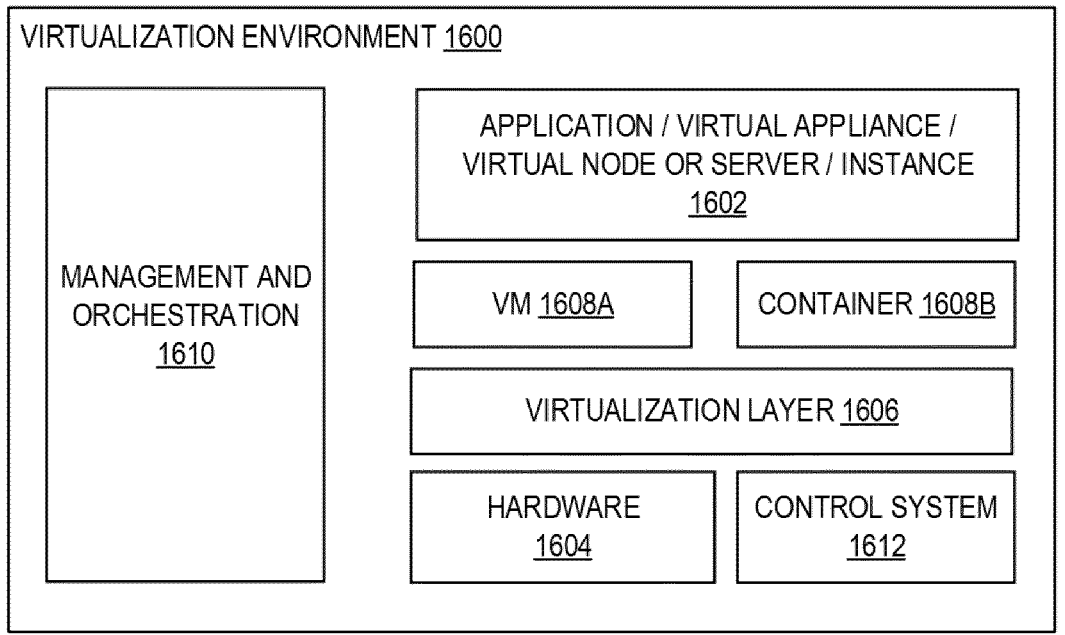
FIG. 16 is a block diagram illustrating a virtualization environment in which functions implemented by some embodiments may be virtualized.

FIG. 16 is a block diagram illustrating a virtualization environment 1600 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 1600 hosted by one or more of hardware nodes, such as a hardware computing device that operates as a network node, a user equipment, core network node, or host. Further, in embodiments in which the virtual node does not require radio connectivity (e.g., a core network node or host), then the node may be entirely virtualized.

Applications 1602 (which may alternatively be called software instances, virtual appliances, network functions, virtual nodes, virtual network functions, etc.) are run in the virtualization environment 1600 to implement some of the features, functions, and/or benefits of some of the embodiments disclosed herein.

Hardware 1604 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 1606 (also referred to as hypervisors or virtual machine monitors (VMMs)), provide VM 1608A and/or container 1608B, and/or perform any of the functions, features and/or benefits described in relation with some embodiments described herein. The virtualization layer 1606 may present a virtual operating platform that appears like networking hardware to the VM 1608A and/or container 1608B.

The VM 1608A and/or container 1608B comprise virtual processing, virtual memory, virtual networking or interface and virtual storage, and may be run by a corresponding virtualization layer 1606. Different embodiments of the instance of a virtual appliance 1602 may be implemented on one or more of the VM 1608A and/or container 1608B, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 1608A and/or container 1608B may be a software implementation of a physical machine that runs programs as if they were executing on a physical, non-virtualized machine. Each of the VM 1608A and/or container 1608B, and that part of hardware 1604 that executes that VM, be it hardware dedicated to that VM and/or hardware shared by that VM with others of the VMs, forms separate virtual network elements. Still in the context of NFV, a virtual network function is responsible for handling specific network functions that run in one or more of VM 1608A and/or container 1608B on top of the hardware 1604 and corresponds to the application 1602.

Hardware 1604 may be implemented in a standalone network node with generic or specific components. Hardware 1604 may implement some functions via virtualization.

Alternatively, hardware 1604 may be part of a larger cluster of hardware (e.g. such as in a data center or CPE) where many hardware nodes work together and are managed via management and orchestration 1610, which, among others, oversees lifecycle management of applications 1602. In some embodiments, hardware 1604 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 1612 which may alternatively be used for communication between hardware nodes and radio units.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method of managing data storage in a communication system, wherein the communication system includes a plurality of clusters of network nodes, wherein the network nodes in each cluster of network node include one or more data storage nodes, the method comprising:

receiving data to be stored from a data source node;

generating, from the data to be stored, a first subset of erasure coded chunks;

causing the first subset of erasure coded chunks to be stored in one or more of the data storage nodes in at least one first cluster of the plurality of clusters;

determining whether to send, to a second cluster, the data to be stored or a second subset of erasure coded chunks different to the first subset of erasure coded chunks by determining whether a size of the data to be stored is smaller than a size of the second subset of erasure coded chunks;

sending, to the second cluster, the data to be stored in response to determining that the size of the data to be stored is smaller than the size of the second subset of erasure coded chunks; and sending, to the second cluster, the second subset of erasure coded chunks in response to determining that the size of the data to be stored is larger than the size of the second subset of erasure coded chunks.

2. Apparatus for managing data storage in a communication system, wherein the communication system includes a plurality of clusters of network nodes, wherein the network nodes in each cluster of network nodes include one or more data storage nodes, the apparatus comprising a processor and a memory, the memory containing instructions executable by the processor such that the apparatus is operable to:

receive data to be stored from a data source node;

generate, from the data to be stored, a first subset of erasure coded chunks;

cause the first subset of erasure coded chunks to be stored in one or more of the data storage nodes in at least one first cluster of the plurality of clusters;

determine whether to send, to a second cluster, the data to be stored or a second subset of erasure coded chunks different to the first subset of erasure coded chunks by determining whether a size of the data to be stored is smaller than a size of the second subset of erasure coded chunks;

send, to the second cluster, the data to be stored in response to determining that the size of the data to be stored is smaller than the size of the second subset of erasure coded chunks; and send, to the second cluster, the second subset of erasure coded chunks in response to determining that the size of the data to be stored is larger than the size of the second subset of erasure coded chunks.

3. The apparatus of claim 2, wherein the memory contains instructions executable by the processor such that the apparatus is operable to determine whether to send, to the second cluster, the data to be stored or the second subset of erasure coded chunks by receiving an indication of whether to send, to the second cluster, the data to be stored or the second subset of erasure coded chunks from a data storage control node.

4. The apparatus of claim 3, wherein the memory contains instructions executable by the processor such that the apparatus is operable to receive, from the data storage control node, an indication identifying the second subset of erasure coded chunks when the indication of whether to send, to in the second cluster, the data to be stored or the second subset of erasure coded chunks comprises an indication to send the second subset of erasure coded chunks.

5. The apparatus of claim 2, wherein the memory contains instructions executable by the processor such that the apparatus is operable to receive, from a data storage control node, at least one of:

an indication identifying a data storage handling node in the second cluster;

an indication of the first subset of erasure coded chunks; or an indication identifying a respective storage node in the at least one first cluster for each erasure coded chunk of the first subset of erasure coded chunks.

\* \* \* \* \*